United States Patent [19]

Jones et al.

[11] Patent Number: 5,764,785
[45] Date of Patent: Jun. 9, 1998

[54] OBJECT IDENTIFICATION SYSTEM

[76] Inventors: Mark F. Jones, 3160 Rustling Way, San Antonio, Tex. 78249; James C. Lyman, 238 Circle Dr., Pipe Creek, Tex. 78063

[21] Appl. No.: 517,378

[22] Filed: Aug. 21, 1995

[51] Int. Cl.$^6$ .................................................. G06K 9/00

[52] U.S. Cl. .................... 382/106; 382/321; 359/798; 356/3; 356/11

[58] Field of Search .................................. 382/106, 189, 382/214, 321; 356/3, 5.06, 11; 359/798; 364/137; 358/510, 509

[56] References Cited

U.S. PATENT DOCUMENTS 4,264,927  4/1981  Raymond et al. ................. 358/108

*Primary Examiner*—Jose L. Couso
*Assistant Examiner*—Anh Hong Do
*Attorney, Agent, or Firm*—John G. Costa

[57] ABSTRACT

A system for the remote identification of objects under varying light conditions. Objects are illuminated with a non-coherent light source for viewing by an observer. A low power laser diode and lens system which sends a laser beam out on an inclined plane determines the distance to and size of objects under observation. A significant change of position of objects under observation causes an alarm to be activated.

13 Claims, 7 Drawing Sheets

OBJECT IDENTIFICATION SYSTEM

FIELD OF THE INVENTION

The present invention relates to object identification. More particularly, it relates to object identification under diverse light conditions. Specifically, it relates to the use of a single instrument for identification of an object under changing light conditions without modification of the instrument.

BACKGROUND OF THE INVENTION

Night observation systems are well known in the prior art. The roots of these systems can be traced back to before World War II.

Night observation systems are generally divided into active and passive systems. Some night observation systems work by flooding an area under observation with infrared energy.

Active systems have an infrared filter that uses a special lens coating. When infrared light passes through a filter designed to transmit infrared light below 900 nanometers, the filter glows. An auxiliary source of infrared light can be used to illuminate the object under observation. Objects in the observation area reflect infrared energy back to the sensor in the imaging device. A disadvantage of these active systems is that the location of a covert observer may be revealed.

As technology developed some of the disadvantages of active systems were overcome by the use of passive imaging systems. Passive systems usually do not disclose the location of the observer, since they do not emit visible light. The main disadvantage of these systems is the difficulty encountered in distinguishing the object under observation from background noise, such as infrared energy from other sources. Another example of a problem encountered with low resolution is that, in military situations, during combat maneuvers, camels can be confused for tanks.

There are currently at least two types of passive night vision systems.

One type, known as a thermo-imaging system, picks up the emission of heat energy from the objects under observation. A thermo-imaging system detects long wavelength, for example 8–14 micron, infrared radiation emitted from objects as a result of their temperature, usually −20° to +2500° F. A disadvantage of this type of system is that the resultant image lacks clear, identifying qualities. This is particularly disadvantageous in a law enforcement scenario where a police officer must be able to identify the suspect being imaged in order to maintain a proper chain of custody. With thermo-imaging systems, it is difficult not only to maintain a proper chain of custody but also to distinguish friend from foe. Another disadvantage of the thermo-imaging system is that distortion occurs when the system is exposed to visible or infrared light from, for example, a headlight, a flashlight or the sun. A further disadvantage of the thermo-imaging system is that most systems are designed to be used with an eyepiece for viewing. This decreases the peripheral vision and increases the vulnerability of the observer.

A second type of passive night vision system is called a light intensifier system. A light intensifier system takes a very low level of visible light and magnifies it until it is visible to the naked human eye. Unlike the other described systems, the light intensifier system works in the visible spectrum. The light intensifier system does not work in a totally dark environment. Another difficulty with the light intensifier system is that the image produced is green, and usually "grainy" or blurred. Furthermore, distortion occurs when the system is exposed to visible or infrared light from, for example, a headlight, a flashlight or the sun. The light intensifier systems are usually constructed in a binocular or scope configuration which decreases the peripheral vision and increases the vulnerability of the observer.

Thus, both thermo-imaging systems and light intensifier systems have relatively low resolution and create a shadowy image, can be damaged when subjected to high intensity light sources, and may decrease the peripheral vision and increase the vulnerability of the observer.

An example of a hybrid system is that of a light intensifier system with laser illumination. This system uses the traditional, passive, light intensification method of imaging supplemented by an infrared laser light illumination of the field of view. The laser has the capability of "viewing" for great distances. However, the image is usually viewed through an eyepiece and appears green and grainy. Also, compared to the method introduced in this invention, the laser does not provide as high a reflective factor or as wide an area of illumination.

With all of the currently used systems, it is difficult to obtain an accurate description of the subject or terrain under observation or to determine if the subject being viewed is holding a weapon.

Also, it is believed that none of the known systems provide any range or distance information for the image that they generate and that the distance of an object under observation from the point of observation cannot be accurately determined with the observation systems mentioned. As a knowledge of the distance to an object is necessary for the determination of the size of that object, the distance to an object is critical for complete object identification. For example, determining the distance to an object and calculating the size of that object can help distinguish whether the object is an adult or a child.

Night observation systems have been disclosed by Meyers in U.S. Pat. Nos. 4,991,183; 4,853,529; 5,042,048; and 5,056,097. Meyers generally discloses an intensification system that uses laser light to supplement the available unseen light. This illuminates an area through the use of infrared lasers which generate coherent light in the observed area. The object under surveillance is displayed as a green image using an eye piece.

Pinson, in U.S. Pat. No. 4,947,044 for a method and apparatus for covertly viewing a target, disclosed the selection of a frequency band of infrared radiation having the least effective transmittance properties of all frequencies of infrared radiation in given atmospheric conditions to illuminate a target and the detection of the reflection of that selected frequency band of infrared radiation from that target. In Pinson, at sea level, all the bands have wavelengths of greater than 1.35 microns.

Other known systems, such as the one designed by Agema Infra Red Systems, use a thermo-imaging system with a video camera format that is used in surveillance applications as well as the thermo measurement of faults in the inspection of electronic or pressurized systems. Thermo-imaging systems have the disadvantage that the quality of the image decreases as the distance of the object under surveillance from the imaging device increases. It is difficult to determine, in a short time, the accurate distance to the object under observation. As the object under observation moves, it is also difficult to follow that object with precise accuracy.

An advantage of the present invention is that non-coherent light is fanned out onto the entire field of view. Compared to the relatively small area that is viewed using the Meyers system, this is an advantage, since the whole area that is viewed by the electro-optic imaging sensor can be displayed on a display screen. The present invention uses near infrared wave lengths giving a large reflection for the surfaces under observation. This provides a more accurate gray scale image with the advantage that the display reveals much more detail of the object under observation. An example of the high resolution that is accomplished with the present invention is that if the object under observation is a human being, the observer can determine by looking at the display screen if the human under observation wears glasses, or if he is carrying any weapons, or other objects. The present invention also provides the advantage that the range or distance of the object under observation is determined with great accuracy. Knowledge of the distance from the object to the viewer is then utilized to determine the actual size of the observed object. Thus, with the current invention, the viewer not only can determine if the object under surveillance is a human being, but also if the human being is an adult or a child.

It is an object of the present invention to observe objects, including animals and humans, at night, or in any light condition, without emitting visible light and simultaneously to create an image with enough detail to clearly identify the characteristics of the objects under observation. A high resolution image generally allows one to differentiate objects and to distinguish, for example, a human from a weight or structure. If the object is human, it may allow one to determine precise characteristics such as sex, attire and objects that the person is carrying. It is another objective of the present invention to enable the user to determine the exact distance from the observation point to the object or objects under surveillance and to estimate the size of the object under observation. Therefore, if the object is human, it may allow one to distinguish an adult from a child. It is another objective of the present invention to create a high resolution image so that small scale movement of the observed object can be detected, without confusing it with other environmental factors. It is another object of the invention to detect when the observed object makes any significant moves and to distinguish mobile objects from stationary objects. Other objectives of the invention will be apparent from the specification and claims.

SUMMARY OF THE INVENTION

The invention is an object identification system comprising an imaging system that uses non-coherent broad band light invisible to the naked eye to generate a high resolution image of the object under observation, a range finder that determines the actual distance to the object under observation and a movement sensor for detecting the movement of the object under observation.

Non-coherent light is filtered and projected onto an area to be observed. Light, both that light projected from the imaging system and available ambient light, is reflected from the object under observation to the reception means, such as a lens, of an electro-optic imaging device which is sensitive to available visible light and infrared light. The electro-optic imaging device translates the light received by the reception means into an electronic signal. The electronic signal is then transmitted to a display device which translates the electronic signal into an image of the object under observation. The image of the object under observation is displayed on the screen of the display device. By relating the size of the image displayed on the screen to a pre-calibrated scale on said screen the height of the object can be determined. The display device can stand alone or be integrated into the same housing as the imaging system. In the alternative or simultaneously, the electronic signal can be transmitted to a storage device, such as a conventional VCR or a computer disc, for later viewing.

The distance to the object in the image is determined by the use of a low power laser diode which generates a laser beam onto a lens system that fans the laser beam out as an inclined plane of light. When the inclined plane of light crosses an object, a line of light is reflected off the object back to an imaging means. The imaging means translates said line of light into a second electronic signal. A display means translates said second electronic signal into a line which is displayed on the screen of said display means. By relating the position of the line displayed on the screen to a pre-calibrated scale on said screen the distance to the object can be determined. Preferably, the imaging means and display means of the range finder are the same as the imaging means and display means of the imaging system.

Thus, through previous calibrations, the distance to and height of the object under observation can be determined by observing the images in the monitor, and, consequently, more complete object identification can be achieved.

The system detects significant movement of the objects under observation. This feature improves distinction of mobile objects, such as humans, from immobile objects, such as statues. The system comprises a movement sensor for detecting the movement of the object under observation and an alarm may be activated when significant movements are detected.

The movement sensor comprises a display driver circuit board which outputs video electronic signals whose voltage levels correspond to the screen positions of the lines displayed on a screen by a range finder and a scan threshold detector which, every set time interval, processes said video electronic signals. The time intervals can be set by the operator or pre-programmed into the movement sensor. For each time interval, the scan threshold detector assigns horizontal and vertical digital addresses to each line displayed on a screen by a range finder, and outputs said addresses as digital address signals. A line may represent an object under observation or a known object. The movement sensor also comprises a microchip to read said digital address signals and to transmit a digital map of said digital address signals to RAM for storage. The RAM is conventional computer RAM which, because it stores a digital map of address signals for each time interval, is also referred to as Map RAM. The movement sensor further comprises a micro controller which, every set time interval, compares the map for the most recent time interval with the map for at least one previous time interval. Again, the time intervals can be set by the operator or pre-programmed into the movement sensor. In addition, the movement sensor comprises an alarm which is activated when the map from the most recent time interval differs from the map of at least one previous time interval. The sensitivity of the alarm, that is, the degree of change which must occur to activate the alarm, can be set by the operator or pre-programmed into the movement sensor. Notably, the accuracy of the movement sensor is improved when the movement sensor is stationary. In the hand held embodiment of the object identification system, the observer may need to hold the system still for a period of time or, in the alternative, to compare, over a period of time, the position of the object under observation with the position of a known stationary object. Relating the position of an object being observed to the positions of at least one, preferrably two, and most preferrably three or more objects with fixed positions improves the accuracy of the movement sensor.

DETAILED DESCRIPTION OF THE INVENTION

Figure 1:
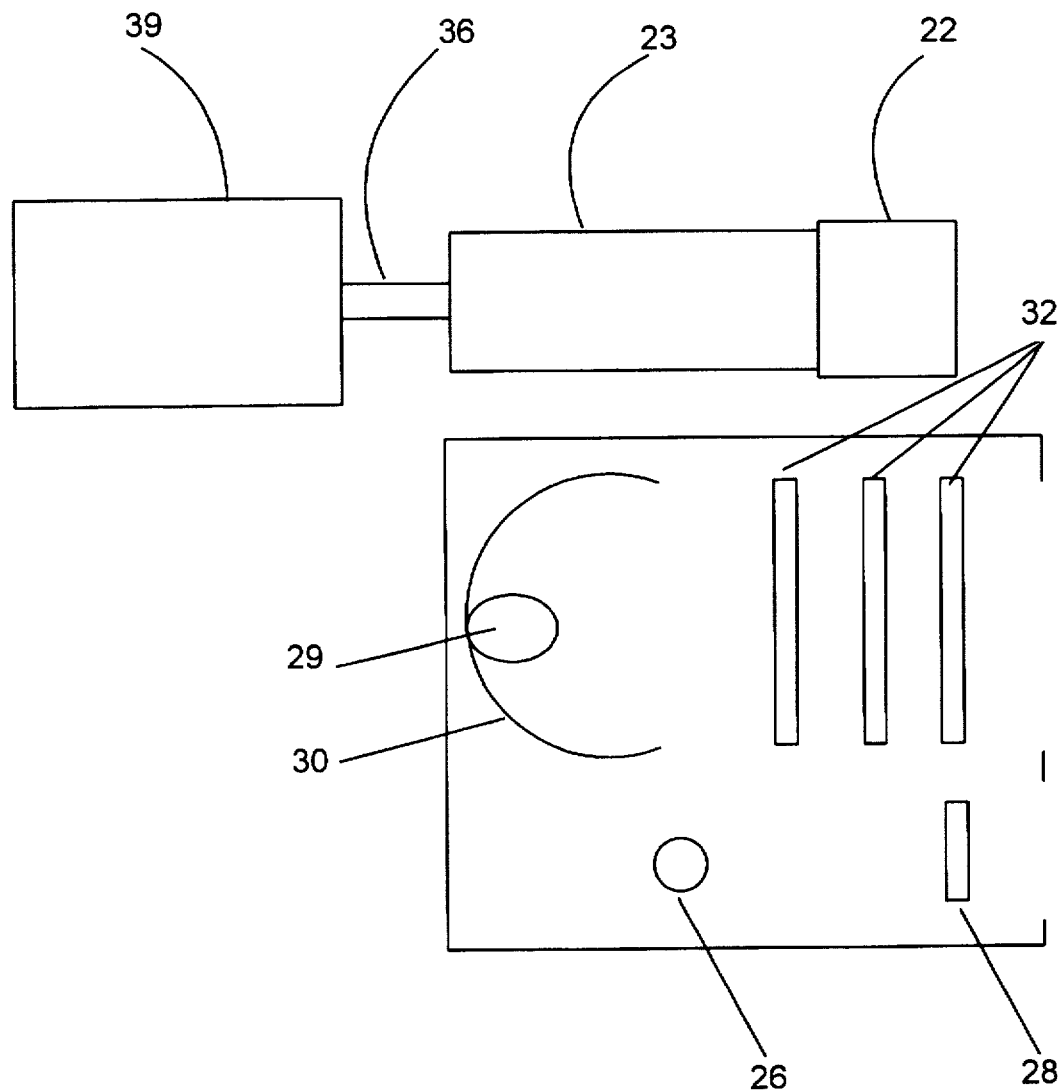
FIG. 1 is a side elevation schematic view showing the components of the invention.

FIG. 1 is a schematic of the invention. Light source 29 emits light. Light directly emitted from the light source or reflected by reflector 30 then passes through filters 32. Filters 32 are infrared pass filters, which allow the passage of infrared light and prohibit the passage of visible light. In the alternative, a clear filter, in place of one or more of the filters can be used. Filters are selected depending on the wave length of light which is desired for illumination of the area under observation. When a clear filter is used, without an infrared filter, the range of the wave lengths of the filtered light will be the same as the range of the wave lengths of the light source.

Light source 29 is a non-coherent light source with a color temperature between 2000 Kelvins and 3500 Kelvins, and with a color rendition index (CRI) of more than 90. In the preferred embodiment, the light source is quartz halogen or xenon bulb with a color temperature from about 2500 Kelvins to about 3000 Kelvins, and with a color rendition index (CRI) of more than about 95.

The pass filters 32 preferably permit passage of light in the range of 800 to 1000 nanometers, and more preferably in the range of from 825 to 925 nanometers. The Most preferred wavelengths for the passage of light through the filters are from about 850 nanometers to about 900 nanometers.

The maximum temperature produced by the light source should be low enough so as not to cause deterioration of the filters or the light housing. Said deterioration is usually not a problem if the heat created by the light source does not exceed 250° F., the housing is insulated and vented, and the light source side of the filters are mirror coated to allow visible light to be reflected back into the housing. The mirror coating of the filter nearest the light source is particularly important to prevent absorption of heat by the filters and thereby to prevent deterioration or cracking of the filters. Likewise, the reflector 30 should be made of aluminum, nickel, silver or plastic and must have a highly reflective, heat resistant coating. Dicroic coatings should not be used as these coatings allow infrared light to "escape" through the reflector and thus allow a loss of infrared reflection.

When an object is illuminated by the filtered light (71, in FIG. 6) or by available light, an image of that object is reflected directly or indirectly onto lens 22 of the electro-optic imaging device 23. The electro-optic imaging device 23 is sensitive to low levels of light over a broad range of wave lengths.

When an indirect reflection of the illuminated object is desired, a series of mirrors or lenses may be required to rotate the reflection for viewing. The exact position of those mirrors or lenses would be determined by the relative positioning of lens 22 to the reflected beam.

In the preferred embodiment, the electro-optic imaging device 23 is highly sensitive to the short wavelength of the infrared spectrum, i.e. the near infrared range, and is sensitive to low levels of available light. However, unlike the previously known light intensification systems, the electro-optic imaging device is not subject to damage when exposed to high intensity light sources such as headlights and the sun. Furthermore, the unique characteristics of the electro-optic imaging device of this invention include the capability of being used for observation in both daylight and total darkness and the capability of switching from daylight to total darkness within seconds and without a change of components. An example of electro-optic imaging devices suitable for use in the preferred embodiment is a miniature solid state CCD image sensor, with less than 1.0 lux, and, most preferably, less than 0.1 lux sensitivity at F 1.4, and, with capability to support, at least, 510 (H)×492 (V) pixels, which can sense light in both the visible and infrared spectrum, and, in particular, can sense reflected light with wavelengths from less than 400 to more than 900 nanometers.

The electro-optic imaging device generates electronic signals for the production of images of high resolution and definition. These electronic signals are then transmitted through video cable 36.

Laser light source 26, which uses a low power laser diode, such as a Class I, 830 nanometer laser with safe sensor, projects a beam of light onto lens 28. Lens 28 disperses the laser beam into a plane of light (60, in FIG. 5). When the plane of light 60 strikes one or more objects, lines, such as 66 and 67 in FIG. 6, will be reflected back to lens 22. Electronic signals representing said lines are then transmitted from electro-optic imaging device 23 through video cable 36.

In the preferred embodiment, laser light source 26 lies at least one inch below light source 29.

Video output electronic signals are transmitted through video cable 36 are received and are processed by a display driver circuit board and the image and lines are viewed on the display screen of a standard monitor 39. The monitor can be integrated into the housing or free standing.

Figure 2:
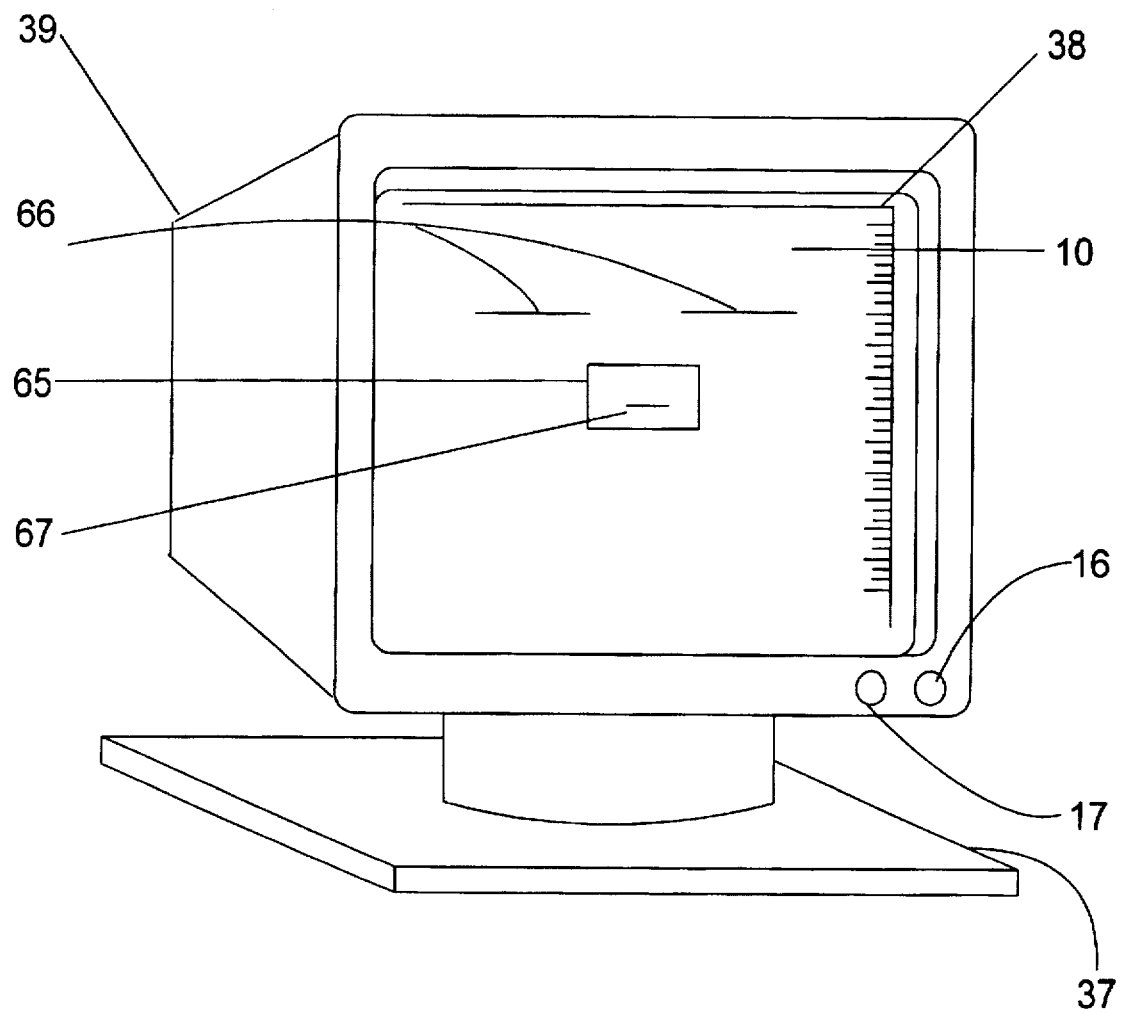
FIG. 2 shows a monitor of one of the embodiments of the invention.

FIG. 2 shows the monitor displaying images from the night illumination system and the range finder. Monitor 39 has base 37. The image of object 65 and the image of lines 66 and 67 can be adjusted for brightness with brightness control 16 and the contrast can be adjusted with display contrast control 17. The display brightness control 16 is provided to modify the brightness of the image created. The display contrast control 17 is provided to arrange the contrast of the shadows created on the image on the display board 10.

Figure 3:
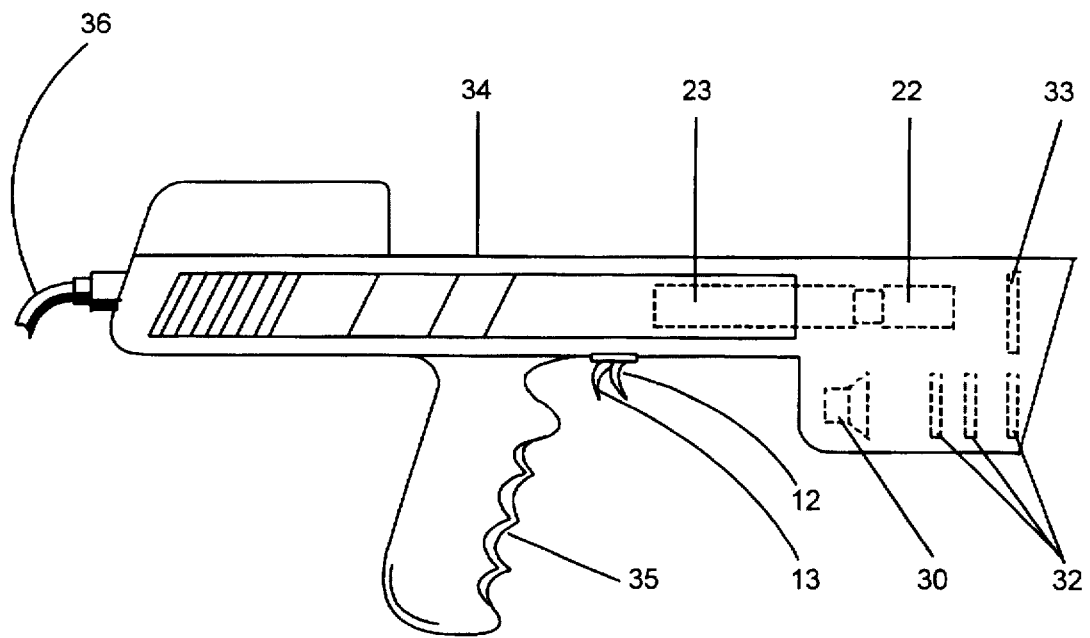
FIG. 3 shows a hand held embodiment of the invention.
Figure 4:
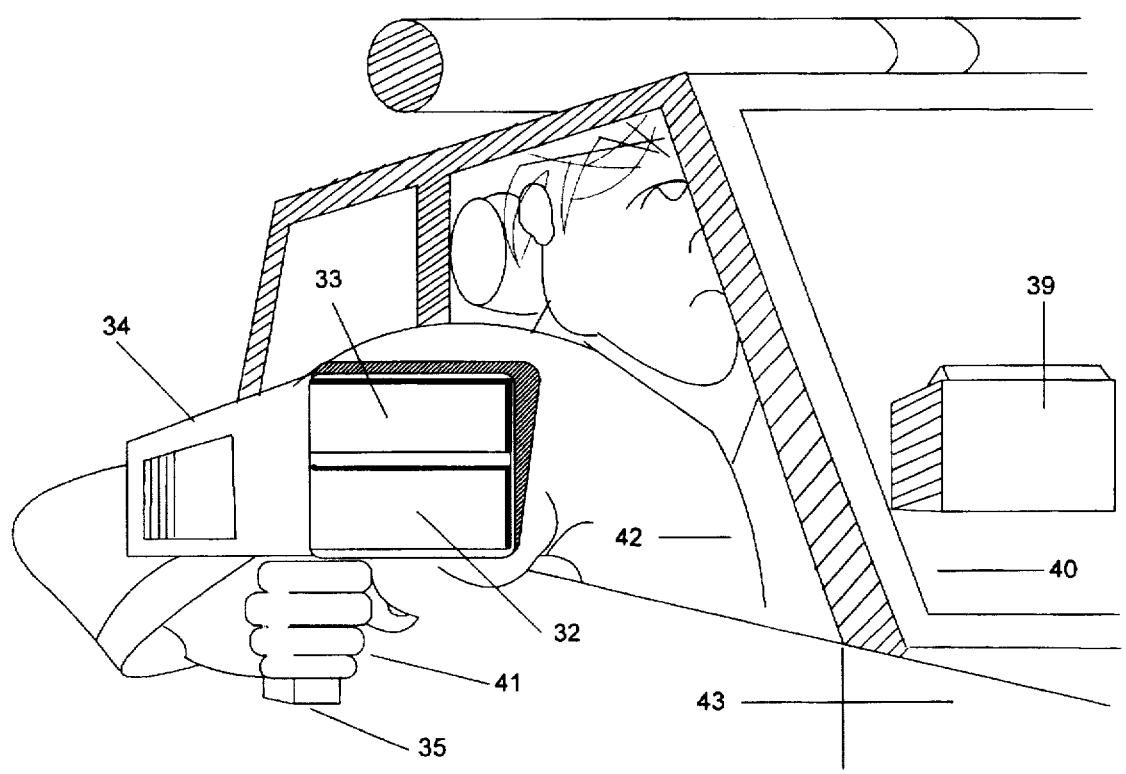
FIG. 4 shows the hand held embodiment of the invention mounted on a vehicle.

FIGS. 3 and 4 show a hand-held embodiment of the present invention. System power switch 12 turns the system on and off. Light power switch 13 turns the light on and off. The user's hand 41 holds handle 35 of the system controller 34. It shows the glass view port 33 and monitor 39. Monitor 39 is installed on dashboard 40 of vehicle 43. User 42 is inside vehicle 43.

Figure 5:
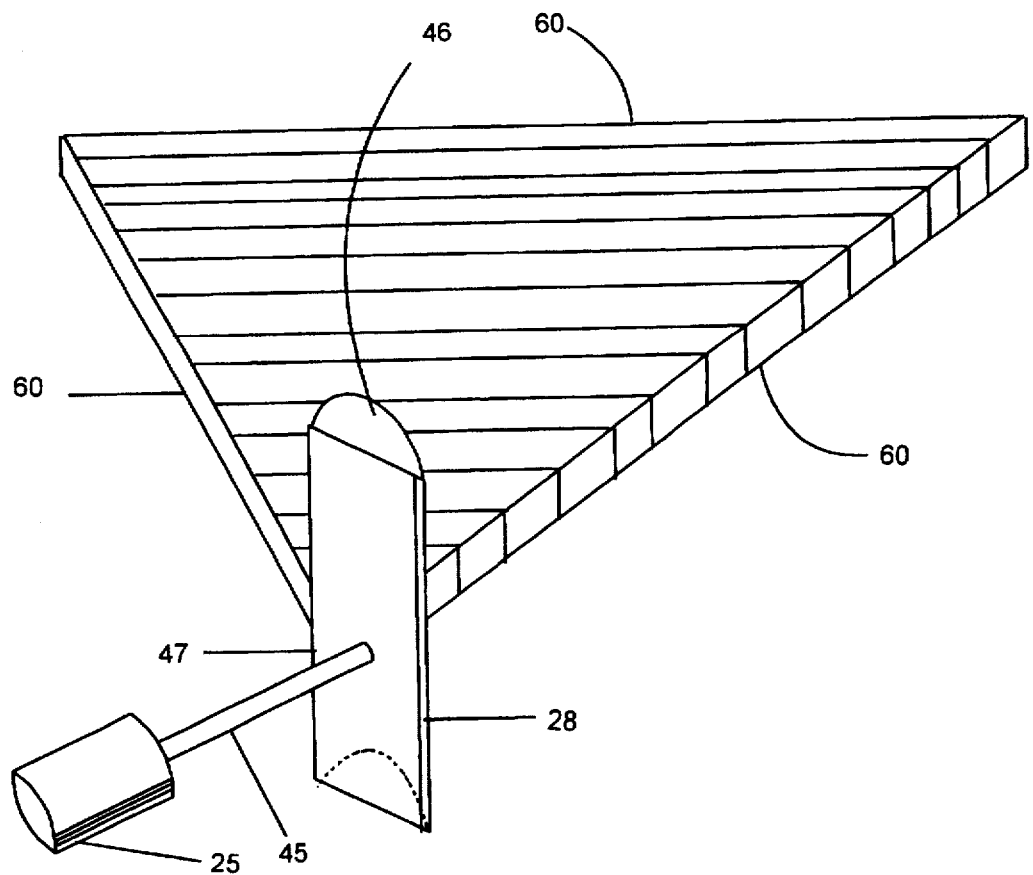
FIG. 5 shows a perspective view of the range finder of the invention.

FIG. 5 illustrates how the laser beam 45 is dispersed. Range finder 25, containing laser light source 26, shown in FIG. 1, emits laser beam 45. The laser beam 45 goes through diversion lens 28. Diversion lens 28 is curved on edge 46 and is not curved on edge 47. After laser beam 45 goes through diversion lens 28, the plane of light 60 is emitted from diversion lens 28, projecting itself to the area under observation.

Figure 6:
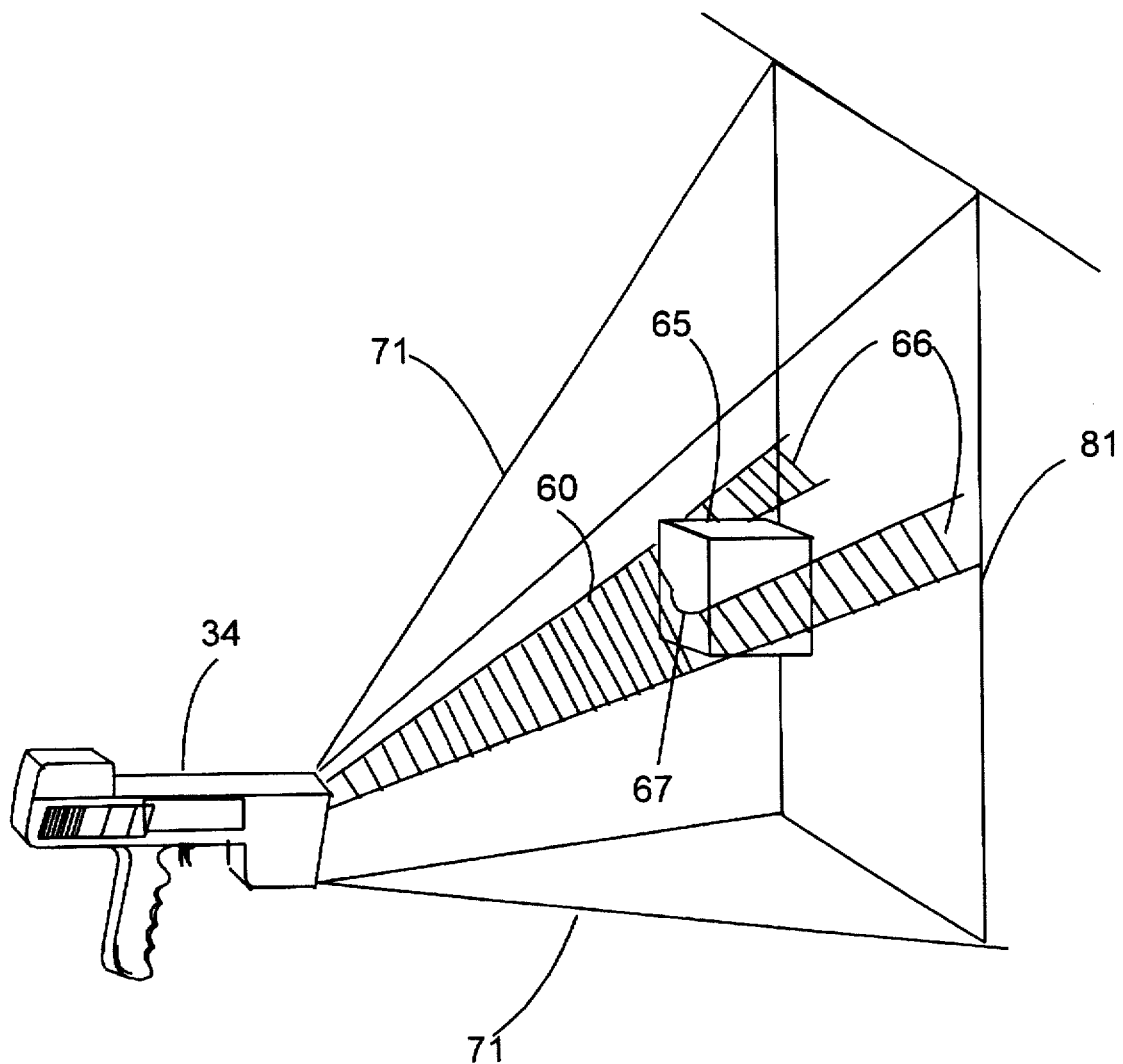
FIG. 6 shows a perspective view of how the range finder and the illumination system work.

FIG. 6 schematically illustrates the use of the range finder in conjunction with the night vision system. FIG. 6 shows an object 65, the plane of light 60, wall 81, filtered light 71 and system controller 34. A range finder is incorporated into system controller 34. The plane of light 60 is projected onto the field of observation. When filtered light 71 is projected towards wall 81 and object 65 is in front of filtered light 71, the area of wall 81 illuminated by filtered light 71 and object 65 reflect back an images that are received by the electro-optic imaging device. The projection of the plane of light 60 onto object 65 creates line 67. Line 67 will reflect back to the electro-optic imaging device 23. The parts of the plane of light 60 which do not project onto object 65 will continue to go on until they project onto other objects or dissipate. In FIG. 6, the parts of the plane of light 60 which do not project onto object 65, continue on to project onto wall 81, creating lines 66. Reflections of lines 66 and 67 and object 65 are then received back at lens 22 of the electro-optic imaging device 23. Lines 66, 67 and object 65 are then displayed on screen 10 of monitor 39 of FIG. 2. By matching lines 66 and 67 to ruler 38, the distance of the object 65 and wall 81 can be determined. Taking the distance to object 65 into account and further matching the screen height of the image of object 65 to ruler 38, the actual height of object 65 can be determined. Both the distance and height determinations are done using previously calibrated scales. The higher the position of the line displayed on the screen, the greater is the distance to the object. In other words, the screen contains the tabulated ruler 38. When the user uses the ruler to measure the height of the laser lines 66 and 67 in the display, the tabulated ruler will show the distance to the object. The ruler can also be tabulated to give a value for the screen height of object 65. Using a precalculated table for screen height and distance, the observer can determine the actual height of object 65.

Figure 7:
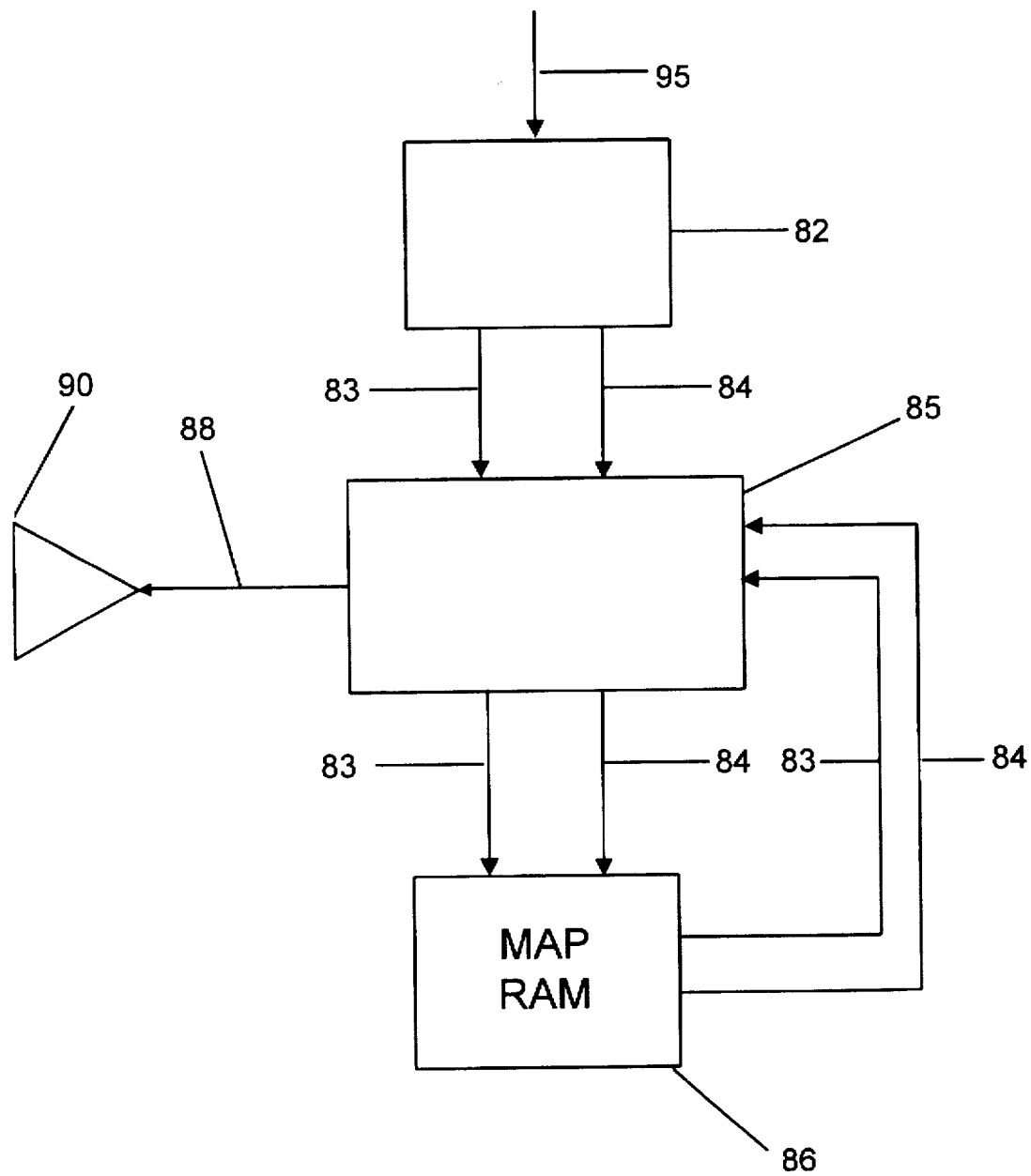
FIG. 7 shows a flowchart of the alarm system.

FIG. 7 is a block schematic diagram of how the movement sensor operates. The movement sensor is incorporated in a display driver circuit board, such as a miniature PC board with standard components. The video output electronic signal 95 comprises voltage levels that are congruent with the screen positions of lines 66 and 67 shown in FIG. 6. The scan threshold detector 82, such as a micro computer, processes the video signal to determine the horizontal and vertical positions of lines 66 and 67 of FIG. 6. After these positions are determined, it outputs a digital address signal 83 of the horizontal position and the digital address signal 84 of the vertical position. These addresses are read by micro-chip 85, such as a suitable IBM computer chip. Micro-chip 85 will then send digital signal 83 and digital signal 84 to Map RAM 86 where both signals are stored. Standard computer RAM chips can be used for the Map RAM. With address signals 83 and 84 stored in Map RAM 86, the micro controller 85 will continually read the address signals 83 and 84 that are stored in Map RAM 86 and will compare them with the new address signals 83 and 84 that are being sent by threshold detector 82. If an address is different, then movement of an object has occurred. The micro controller 85 will then emits a signal 88 that will activate alarm 90. If the old addresses that are stored at Map RAM 86 are the same as the new addresses that are sent by threshold detector 82 then the path will continue until an address is different.

In the alternative, addresses of one or more known fixed objects and one or more observed objects can be mapped at different points of time and, the movement sensor can be programmed, using basic geometric and trigonometric relationships, to determine if the object under observation has moved relative to the known fixed objects.

Relating the position of an object being observed to the positions of at least one, preferably two, and most preferably three or more objects with fixed positions improves the accuracy of the movement sensor. For example, a patrol car can record a map of an area with known fixed objects and an unknown object on a first pass, or drive by, and compare that first pass map with a second pass map to determine if the position of the unknown object relative to the known fixed objects has changed. As another example, if three known fixed objects and one object under observation are mapped from any point of observation and those same objects are mapped from a second point of observation at a subsequent point in time, one can determine, using basic geometric and trigonometric relationships, if any object under observation has moved relative to any known fixed objects.

Notably, a digital address signal for distance information, determined, for example, by a range finder, for each line can be indexed to the horizontal and vertical digital addresses and added to the map information. Such distance information can be input manually or automatically. In this event, the distance digital address will be processed in the same manner, through the same pathways, as the horizontal and vertical digital addresses.

The foregoing is the preferred embodiment of the invention. However, various changes can be made in the system without departing from the scope of the invention, so the preferred embodiment should not be interpreted as limiting the scope of the invention.

What is claimed:

1. A remote object identification system comprising at least one component selected from the list of components consisting of an imaging system, a range finder, and a movement sensor, wherein:

said imaging system comprises:
a non coherent light source for generating light, said non-coherent light source having a color temperature between 2000 Kelvins and 3500 Kelvins and a color rendition index (CRI) of more than 90,
a filter means for filtering said generated light, wherein said filter means permits the passage of light in the range of from 800 nanometers to 950 nanometers,
a first imaging means for the translation of visible and infrared light reflected from said object into a first electronic signal,
a first display means for the translation of said first electronic signal into an image of said object, said image being displayed on the screen of said first display means, and said range finder comprises:
a low power laser diode to generate a laser beam,
a lens system that fans said laser beam out as an inclined plane of light, said plane of light being reflected from said object as a line of light,
a second imaging means for the translation of the visible and infrared light in said line of light into a second electronic signal,
a second display means for the translation of said second electronic signal into a line which is displayed on the screen of said second display means; and,
a pre-calibrated scale on the screen of said second display means for the determination of the distance to said object; and, said movement sensor comprises:
- a display driver circuit board which outputs video electronic signals, whose voltage levels correspond to the screen positions of the lines displayed on a screen by a range finder,
- a scan threshold detector which, every set time interval, processes said video electronic signals, assigning horizontal and vertical digital addresses, for each time interval, to each line displayed on a screen by a range finder, and outputting said addresses as digital address signals,
- a microchip to read said digital address signals and to transmit a digital map of said digital address signals to RAM for storage,
- a micro controller which, every set time interval, compares the map for the most recent time interval with the map for at least one previous time interval.

2. The remote object identification system of claim 1 wherein said imaging system further comprises a pre-calibrated scale on the screen of said first display means for the determination of the height of said object.

3. The remote object identification system of claim 1 wherein said movement sensor further comprises an alarm which is activated when the map from the most recent time interval differs from the map of at least one previous time interval.

4. The system of claim 1 wherein said non-coherent light source is chosen from the group consisting of quartz halogen bulbs and xenon bulbs.

5. The system of claim 1 wherein said non-coherent light source has a color temperature from about 2500 Kelvins to about 3000 Kelvins.

6. The system of claim 1 wherein said non-coherent light source has a color rendition index (CRI) of more than about 95.

7. The system of claim 1 wherein said filter means permits the passage of light in the range of from 825 nanometers to 925 nanometers.

8. The system of claim 1 wherein said filter means permits the passage of light in the range of from about 850 nanometers to about 900 nanometers.

9. The system of claim 1 wherein at least one imaging means is a solid state CCD image sensor with less than 1.0 lux sensitivity at F 1.4 and with capability to support, at least, 510 (H)×492 (V) pixels.

10. The system of claim 1 wherein at least one imaging means is a solid state CCD image sensor with less than 0.1 lux sensitivity at F 1.4 and with capability to support, at least, 510 (H)×492 (V) pixels.

11. The system of claim 1 wherein at least one said imaging means converts light with wavelengths from 400 nanometers to 900 nanometers into an electrical signal.

12. The system of claim 1 wherein at least one said imaging means is sensitive to low level available light.

13. The system of claim 1 wherein said movement sensor comprises a micro controller which compares the map of addresses of one or more known fixed objects and one or more observed objects, at different points of time, to determine if any object under observation has moved relative to any known fixed objects.

* * * * *